Patented June 12, 1951

2,557,041

UNITED STATES PATENT OFFICE 2,557,041

SYNTHESIS OF TRYPTOPHANE

David I. Weisblat and Douglas A. Lyttle, Kalamazoo, Mich., assignors to The Upjohn Company, Kalamazoo, Mich., a corporation of Michigan No Drawing. Application March 11, 1947,
Serial No. 733,982

29 Claims. (Cl. 260—319)

The present invention relates to the preparation of alpha amino acids and is more particularly concerned with a method for the synthesis of tryptophane, alpha-amino-beta-indolepropionic acid.

It is known that alpha amino acids are fundamental in the field of nutrition and physiological chemistry, and it is presently believed that they are the simple units from which proteins are formed. Investigators have isolated over twenty alpha amino acids from products resulting from the treatment of protein material of all kinds. These alpha amino acids may be empirically divided into two groups on a basis of physiological demand. In this way the amino acids may be classified as dispensable, or not absolutely necessary for the preservation and maintenance of animal life, while others may be classified as indispensable, or absolutely essential for animal life. The amino acids, arginine, lysine, histidine, valine, leucine, isoleucine, phenylalanine, threonine, methionine, and tryptophane are considered indispensable in the nutrition of some species of animals, while other amino acids which have been isolated from protein, although of nutritional significance, are not presently considered indispensable in the animal diet.

Inasmuch as tryptophane is considered an indispensable amino acid, the importance thereof, as well as the importance of a new synthesis therefor, is considered obvious.

It is accordingly an object of the present invention to provide a new method for the synthesis of tryptophane. Another object of the invention is the provision of a novel method for the production of tryptophane which involves the alkylation of an ester of nitroacetic acid. A further object of the invention is the provision of a process for the preparation of tryptophane which includes the step of reducing an alpha-nitro-beta-(3-indole)propionate. An additional object of the invention is the provision of a method for the synthesis of tryptophane in a manner which may be conducted with increased facility in comparison with known methods. A still further object of the invention is the provision of a novel method for the synthesis of tryptophane which will be more economically and commercially practicable. Another object of the invention is the provision of a process for the preparation of optical isomers of tryptophane in substantially pure form. An additional object of the invention is the provision of novel intermediates, esters of alpha-nitro-beta-(3-indole)-propionic acid. Other objects of the invention will be apparent from the following specification and claims.

The significance of the alpha amino acids in human and animal nutrition makes their synthesis generally of great importance. The voluminous literature and the great number of attempts to find suitable procedures for the preparation of alpha primary amino acids is indicative of this importance. (Gilman, Organic Chemistry, vol. II, chapter "Natural Amino Acids," by H. T. Clark, pp. 1079–1166, John Wiley and Sons, New York (1943); Schmidt, "The Chemistry of Amino Acids and Proteins," chapter II; "The Constitution and Synthesis of Aminoacids" by Max S. Dunn, Charles C. Thomas, Baltimore (1938); Vickery and Schmidt, Chem. Rev. 9, 169–318 (1931)). The principal methods which have been previously employed for the preparation of amino acids involve: 1. The cyanohydrin synthesis (Strecker synthesis). 2. The action of ammonia on alpha halogen acids. 3. Reaction using malonic esters (a) to give alpha halogen acids for method 2, (b) reaction of phthalamidomalonic ester with halogen compounds, (c) reactions of amino malonic esters, (d) reaction of potassium ethylmalonates with hydrazine. 4. Condensation of aldehydes with (a) hydantoin, (b) diketopiperazine, (c) hippuric acid (azlactone method). 5. From alpha keto acids by (a) reduction and amination, (b) reduction of oximes, (c) reduction of hydrazones.

Many detailed procedures have been proposed for the production of tryptophane, and such procedures usually involve, at least in some stage of the synthesis, one of the above general methods. For example, the preparation of tryptophane from gramine (Albertson et al., J. Am. Chem. Soc. 66, 500 (1944), 67, 36–7 (1945); Snyder et al., J. Am. Chem. Soc. 66, 350 (1944); Howe et al., J. Am. Chem. Soc. 67, 38 (1945)) may be considered as a variant of method 3 (b).

The method of our invention essentially involves reaction of an ester of nitroacetic acid, e. g., ethyl nitroacetate, with a selected alkylating agent (i. e., an agent of the alkylating type which is capable of introducing the beta-indolemethyl group into the nitroacetate molecule, an example of which is gramine, 3-dimethylaminomethylindole), reduction of the nitro ester thus formed, (an ester of alpha-nitro-beta-(3-indole)-propionic acid), isolation of the amino ester and separation of the same into optical enantiomorphs if desired, and hydrolysis of the ester to the amino acid, tryptophane.

The novel process of our invention has the advantage of being much more direct than methods heretofore proposed for the preparation of tryptophane, and has surprisingly failed of recognition by leading investigators as constituting a valuable method for the preparation of the naturally occurring alpha amino acid, tryptophane, throughout the many years in which extensive experimentation has been conducted in an effort to find a practicable method of synthesis.

The alkylation step of our new synthesis may be carried out by reacting together any desired ester of nitro-acetic acid and a selected alkylating agent. By "alkylating agent," as herein employed, is intended any agent comprising at least the beta-indolemethyl group,

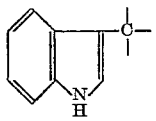

and capable of introducing the same into the acid portion of the nitroacetate molecule at the alpha carbon atom. By the alkylation reaction is effected a combination of

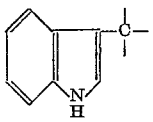

and $$-\text{CH}-\text{COOR}$$
$$\ |$$
$$\text{NO}_2$$

radicals, with the sequential production of an ester of alpha-nitro-beta-(3-indole)propionic acid. As agents in this alkylating capacity may be mentioned the dialkylamines of 3-methylindole, beta-indole-methyl halides, beta-indole aldehyde, 3-methylindole aryl sulfonic esters (such as the para-toluene sulfonate), quaternary ammonium derivatives of 3-methylindole, and (3-indole)carbinol. Thus the compound employed as alkylating agent, which is reacted with an ester of nitroacetic acid, or salts thereof, will, in general, have the formula: (beta-indole)-Z wherein Z indicates (1) —CH₂X, X being a halogen atom, (2) —CH₂NRR', wherein R and R' are a hydrocarbon radical, (3)
$$\begin{matrix} \text{O} \\ \| \\ -\text{C}-\text{H} \end{matrix}$$

(4) —CH₂O—A, wherein A is the residue of an aryl sulfonic ester, such as ethyl (para-toluene)-sulfonate, or chloro (para-toluene)sulfonate, (5) —CH₂NRR'R''X, wherein R, R', and R'' are hydrocarbon radicals, and wherein X is a negative atom or group such as —NO₃ or —Br, and (6) —CH₂OH. The substituent Z, in every case, is in the beta or 3 position on the indole ring.

It will be noted that the esters of nitroacetic acid, O=N—CH₂—COOR, may now be considered as being related to malonic and cyanacetic esters,

ROOC—CH₂—COOR and

NC—CH₂—COOR respectively, in that all of the esters have a negative substituent on the carbon atom alpha to the esterified carboxyl group, and, for this reason, exhibit the same general type of reactiveness. Thus the alkylations of nitroacetic acid esters may be carried out in a manner somewhat similar to the alkylations of malonic and cyanacetic esters and likewise somewhat similar to the alkylations of nitroparaffins; for example, with the employment of gramine, quaternary ammonium salts of 3-methylindole, beta-indole aldehyde, beta-indolemethyl halides, beta-indolemethyl aryl sulfonic esters, and (beta-indole)-carbinol. Any other suitable agent may be employed for the alkylation of the nitroacetates, but the above-mentioned have been found especially satisfactory and their use therefore constitutes a preferred embodiment of the invention.

The alkylation step of our new synthesis may, for example, be carried out by reacting together an ester of nitroacetic acid, e. g., ethyl nitroacetate, and gramine (3-dimethylaminomethylindole), either in the presence or absence of alkali and/or heat. We have found that, when the process is conducted in this manner, it is advantageously, although not necessarily, carried out in an anhydrous organic solvent such as xylene, while passing a slow stream of nitrogen through the reaction with vigorous agitation at a temperature up to about 100 degrees centigrade over a period of about five hours, more or less. During this period of heating a considerable quantity of dimethylamine is evolved. The hot solution may then be filtered from a small amount of crystalline solid which forms and the xylene removed by concentration in vacuo. The residual gum may be dissolved in chloroform, the solution extracted with dilute hydrochloric acid and washed with water until neutral. The remaining solution may be dried, concentrated in a vacuum, freed of excess nitroacetate by distillation under reduced pressure, dissolved in chloroform or similar solvent, and extracted to exhaustion with dilute alkali. After acidification and extraction with chloroform or similar solvent, drying and concentration of the last chloroform extract leaves an oil which crystallises readily. This oil is an ester of alpha-nitro-beta-(3-indole)propionic acid in substantially pure form.

It should be understood that the procedure outlined above for the alkylation of an ester of nitroacetic acid to produce the corresponding alpha-nitro-beta-(3-indole)propionate may be varied widely as to the exact procedure and alkylating agent, many closely related procedures being operative and the exact method of alkylation being of concern only in that an ester of nitroacetic acid be combined with an alkylation agent to yield a desired ester of alpha-nitro-beta-(3-indole)propionic acid. When a beta-indolemethyl halide is employed in the alkylation step, it is advisable to use a metal alkoxide, e. g., sodium methoxide, as catalyst. Alkylations with beta-indole aldehyde may be conducted in the presence of basic, neutral, or acidic catalyst, piperidine and (para-toluene)sulfonic acid being representative. A boron trifluoride catalysis is effective for the alkylation of an ester of nitroacetic acid with beta-indolecarbinol (beta-indole-CH₂OH), and any of these related procedures may be employed in the alkylation step, according to the desire of the operator.

The ester of nitroacetic acid employed in the process may also be varied, and as representative esters may be mentioned the methyl, ethyl, propyl, isopropyl, butyl, amyl, n-hexyl, octyl, caproyl, stearyl, cyclohexyl, benzyl, et cetera. Any ester or ester salt is suitable, and in the following illustrative examples any particular nitroacetate is employed merely as a matter of convenience.

The reduction of the nitro ester may likewise be conducted in any suitable manner. For example, we may place the alpha-nitro-beta-(3-indole)propionate, a small amount of organic solvent, such as absolute ethanol or butanol, and a quantity of Raney nickel cataylst in an autoclave under an original hydrogen pressure of 1500 p. s. i. at about 25 degrees centigrade and raise the temperature to about 100 degrees centigrade until the theoretical amount of hydrogen is absorbed. Other hydrogenation catalysts, such as Adam's catalyst, PtO₂, platinum or palladium may be employed with equal facility, and the apparatus or exact method of conducting the hydrogenation reaction is of concern only in that the nitro group of the nitro ester be reduced to the amino group by the procedure. It may be desired to both reduce and hydrolyse the nitro ester in a single step, and this may be done with equal facility.

After the hydrogenation reaction, the catalyst may be removed by filtration, the remaining liquid concentrated under vacuum, treated with hot dilute sodium hydroxide solution, decolorised with activated charcoal, filtered, and adjusted to the desired pH with glacial acetic acid, whereafter tryptophane crystallises from solution. Other conventional methods may be used to concentrate and crystallise the tryptophane from the reaction product of the hydrogenation, and methods known in the prior art will be found satisfactory for this purpose. Upon further treatment with an additional amount of activated charcoal, filtration and several recrystallisations, tryptophane crystals of exceptional purity are obtained. The reduction may also be carried out chemically with the employment of iron, iron filings, tin, zinc and hydrochloric acid, or with (NH₄)₂S, or other chemical reducing agents, or in any other manner to reduce the nitro group to the amino group and to allow production of tryptophane.

The method of our invention may be more clearly illustrated by the following equations:

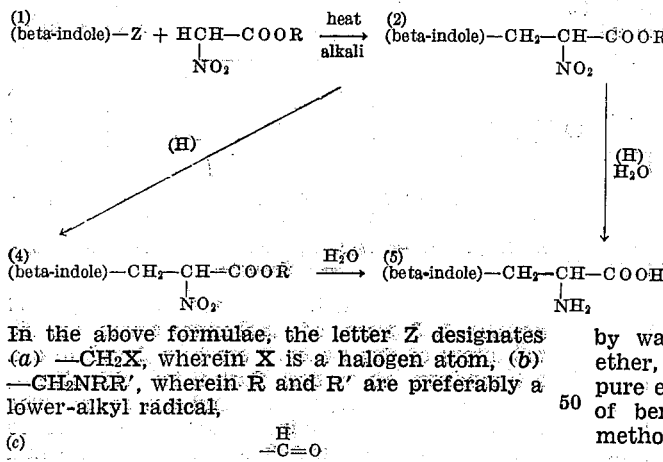

In the above formulae, the letter Z designates (a) —CH₂X, wherein X is a halogen atom, (b) —CH₂NRR', wherein R and R' are preferably a lower-alkyl radical,

(d) —CH₂O—A, wherein A is the residue of an aryl sulfonic ester, (e) —CH₂NRR'R''X, wherein R, R', and R'' are preferably a lower alkyl radical, and wherein X is preferably an acid anion, such as Cl, Br, or NO₃, and (f) —CH₂OH.

If preferred, the reduction and hydrolysis may be conducted in a single operation, as from (2) to (5).

The following examples illustrate several ways in which the principle of our invention may be applied, but are not to be considered as limiting

*Example 1—Esters of nitroacetic acid*

The following procedure was employed for the preparation of methyl, isopropyl, n-hexyl, and cyclohexyl esters of nitroacetic acid.

One mole of alcohol was introduced slowly into 0.38 mole of concentrated sulfuric acid with cooling. Nitroacetic acid (0.25 mole) was then added at between zero and five degrees centigrade and the mixture stirred until solution was obtained. The solution was then allowed to stand at room temperature for from 20 to 40 hours, at the end of which time it was diluted with ice and ice-water. Water was separated and the organic layer diluted with two volumes of ether, after which the ether solution was washed three times with water and dried over magnesium sulfate. After filtration and concentration, the remaining oil was treated in either of the following two ways, depending upon the structure and water solubility of the alcohol used in the esterification.

The methyl and isopropyl esters of nitroacetic acid were subjected to one distillation which yielded the essentially pure ester.

The n-hexyl, cyclohexyl, and benzyl esters were found to form sodium salts which were relatively insoluble in water, insoluble in acetone and ether, and very soluble in alcohol. This was advantageous, inasmuch as the corresponding alcohols appear to have a low water-solubility and are not easily removed from the ester product. The sodium salts were isolated and purified in the following manner:

After the removal of as much alcohol as possible by distillation, the crude ester was treated, slowly, with stirring and cooling in an ice bath, with between about 100 and 150 milliliters of 10 per cent aqueous sodium hydroxide solution. The sodium salt which precipitated was filtered and washed twice with about fifteen milliliters of ice-water and then with acetone. The salt was dried, weighed, and treated with two equivalents of hydrochloric acid in about 100 milliliters of water. The reaction was generally found to be slow, and prolonged shaking was usually necessary to completely free the ester. Ether extraction, followed by washing, drying, and concentration of the ether, resulted in the production of a relatively pure ester, as will be apparent from the analysis of benzyl nitroacetate obtained by the above method.

|  | C | H | N |
|---|---|---|---|
| Theory | 55.3 | 4.64 | 7.75 |
| Found | { 55.82 | 4.43 | 7.78 |
|  | { 55.96 | 4.34 | 7.69 |

In the preparation of the benzyl ester, it was found advantageous to use dry hydrochloric acid gas as a condensing agent, and the procedure employed was as follows:

Benzyl alcohol (127 grams) and 26.3 grams of nitroacetic acid were mixed, and dry HCl gas passed into the mixture with cooling until the solution was saturated at zero degrees centigrade. The solution was allowed to warm to room temperature and was thereafter allowed to stand for two days. Most of the HCl gas, some benzyl chloride, and some alcohol was removed by concentration in vacuo. After dilution with ether, washing with water, drying the ether solution, and concentrating, the ester was treated with sodium hydroxide and worked up as described above.

Properties of some representative esters of nitroacetic acid are as follows:

| Esters | B. P., °C. | mm. Hg | $N_d^{23-26°C.}$ |
|---|---|---|---|
| Methyl | 68.5 | 5.0 | 1.42257 |
| Ethyl | 76 | 5.0 | 1.4210 |
| Isopropyl | 52 | 0.9 | 1.4203 |
| n-Hexyl | | | 1.4364 at 20 |
| Cyclohexyl | | | 1.4640 at 23 |
| Benzyl | | | 1.5202 at 22 |

*Example 2.—Preparation of some esters of alpha-nitro-beta-(3-indole) propionic acid*

The particular nitroacetic acid ester (0.1 mole), gramine (0.1 mole), and 100 milliliters of dry xylene were placed in a three-neck flask of 250 milliliter capacity, which was fitted with a stirrer, nitrogen inlet, thermometer, and condenser. As nitrogen was passed through, the contents of the flask were heated to 90–95 degrees centigrade with efficient stirring. The heating and stirring were continued until evolution of dimethylamine from the reaction ceased, the time required usually being between 3.5 and 5 hours. The xylene was then removed in vacuo, the last traces being removed between about 60–70 degrees centigrade at 0.5 millimeter of mercury pressure.

The crude methyl, ethyl, isopropyl, n-hexyl, cyclohexyl, and benzyl esters of alpha-nitro-beta-(3-indole)propionic acid produced in this manner were capable of further purification and identification, or could be used directly in the reduction step of the process.

Representative esters of alpha-nitro-beta-(3-indole) propionic acid prepared as indicated in the foregoing, and physical constants thereof, are as follows:

ISOPROPYL ALPHA-NITRO-BETA-(3-INDOLE)PROPIONATE

| | C | H | N |
|---|---|---|---|
| $N_D^{45}=1.541$: | | | |
| Theory | 60.85 | 5.83 | 10.12 |
| Found | {60.83 | 5.93 | 9.40 |
|  | {61.27 | 6.27 | 9.14 |

N-HEXYL ALPHA-NITRO-BETA-(3-INDOLE)PROPIONATE

| | C | H | N |
|---|---|---|---|
| $N_D=1.5359$: | | | |
| Theory | 64.13 | 6.97 | 8.80 |
| Found | {64.02 | 6.96 | 9.11 |
|  | {63.69 | 6.97 | 9.00 |

CYCLOHEXYL ALPHA-NITRO-BETA-(3-INDOLE)PROPIONATE

| | C | H | N |
|---|---|---|---|
| $N_D=1.5558$: | | | |
| Theory | 64.54 | 6.37 | 8.86 |
| Found | {64.45 | 6.49 | 9.38 |
|  | {64.55 | 6.62 | 9.18 |

BENZYL ALPHA-NITRO-BETA-(3-INDOLE)PROPIONATE

| | C | H | N |
|---|---|---|---|
| $N_D^{21}=1.592$: | | | |
| Theory | 66.65 | 4.97 | 8.64 |
| Found | {66.48 | 5.07 | 9.02 |
|  | {66.42 | 5.33 | 8.87 |

The latter ester, an oil, crystallized completely upon standing, after which the solid melted at 61.5–62.5 degrees centigrade (uncorr.).

*Example 3.—Reduction of alpha-nitro-beta-(3-indole)propionic acid esters*

The ester (0.01 mole) was dissolved in about 15 milliliters of absolute alcohol and placed in a bomb of 40 milliliters volume with about one gram of Raney nickel catalyst. Hydrogen was introduced into the bomb up to a pressure of about 1500 p. s. i., the temperature being raised to 100 degrees centigrade as rapidly as possible with constant rocking of the autoclave. Reduction usually occurred in about 1.5 to 2 hours, after which the bomb was allowed to cool to room temperature, and the catalyst removed by filtration and washed with alcohol. Alcohol was removed by concentration, the crude ester hydrolysed by refluxing for 2 to 4 hours with 15 milliliters of 10 per cent aqueous sodium hydroxide, treated with 250 milligrams of charcoal, filtered, and the solution brought to a pH of about 5.95 with glacial acetic acid. After removal of a small amount of dark brown amorphous material which usually precipitated immediately, the tryptophane came out upon standing overnight in the cold. The tryptophane was then filtered, washed with a little cold water, alcohol, and finally with ether. The product at this point usually had a grayish white appearance and was recrystallised from 33 per cent alcohol according to usual procedure. Melting points and mixed melting points with an authentic sample proved that the product from each of the esters was dl-tryptophane.

| Starting Ester | dl-Tryptophane [1] | |
|---|---|---|
| | M. P., °C. | M. M. P., °C. |
| Methyl | 284 | 285 |
| Isopropyl | 292 | 291 |
| n-Hexyl | 278.5 | 278 |
| Cyclohexyl | 275 | 276 |
| Benzyl | 272 | 271 |

[1] Uncorrected, decomposition. Melting point and mixed melting point taken together.

*Example 4.—Ethyl alpha-nitro-beta-(3-indole)-propionate*

Gramine, 3-dimethylaminomethylindole, (8.66 grams), 13.3 grams of ethyl nitroacetate, and 50 milliliters of dry xylene were introduced into a 250 milliliter, three-neck flask fitted with stirrer, thermometer, nitrogen inlet and condenser. The temperature of the mixture was then raised to between about 90 and 100 degrees centigrade and maintained at this level for about 5 hours while passing a slow stream of nitrogen through the vigorously stirred mixture. During this time about one-half of the theoretical amount of dimethylamine was evolved, whereafter the hot solution was filtered from a small amount of crystalline solid and the xylene removed by concentration in vacuo. The residual gum was dissolved in chloroform and the resulting solution extracted twice with 50 milliliter portions of 10 per cent HCl and washed with water until neutral. The chloroform solution was dried over $MgSO_4$ and concentrated in vacuo, whereafter excess ethyl nitroacetate was distilled off under reduced pressure, 2.9 grams coming over at 64 degrees centigrade under 3 millimeters of mercury pressure. The residue was dissolved in chloroform and extracted to exhaustion with a 5 per cent aqueous solution of sodium hydroxide. The aqueous alkaline extract was then acidified with 10 per cent HCl and extracted with chloroform; the extract dried, concentrated, and crystallisation of the residual oil allowed to occur. The yield of ethyl alpha-nitro-beta-(3-indole)propionate was 11.8 grams or 90 per cent of theory. The melting point was 60.0 to 62.1 degrees centigrade.

An analytical sample, recrystallised four times from a benzene-petroleum ether mixture, melted at 62.0 to 62.8 degrees centigrade (uncorrected) and analysed as follows:

|  | C | H | N |
|---|---|---|---|
| Theory | 59.69 | 5.38 | 10.69 |
| Found | { 59.65 | 5.46 | 10.78 |
|  | { 59.62 | 5.24 | 10.57 |

Example 5.—Preparation of tryptophane

Ethyl alpha-nitro-beta-(3-indole)propionate (2.62 grams), 15 milliliters of absolute ethanol, and about one-half gram of Raney nickel catalyst were placed in a bomb of 40 milliliters capacity. The reduction was carried out at 100 degrees centigrade and with an original hydrogen pressure of 1500 p. s. i. at 25 degrees centigrade. The theoretical amount of hydrogen was absorbed during a 12 hour period. After filtering off catalyst, the alcohol was removed by concentration under vacuum. The light colored oil which remained was heated under reflux with 16 milliliters of 10 per cent aqueous sodium hydroxide for two hours. After treating with activated charcoal (Darco G-60) and filtering, the pH of the solution was adjusted to 5.9 with glacial acetic acid. Crystals appeared and the flask was cooled for a period of 15 hours, whereafter tryptophane was filtered off and washed with a small quantity of cold water. The wet cake was dissolved in 100 milliliters of 33 per cent alcohol, treated with an additional quantity of Darco G-60, filtered hot, and allowed to cool slowly with rubbing. The tryptophane crystallised out in glistening plates, was filtered and washed with alcohol and with ether. The crystals were then dried in a vacuum.

An analytical sample was prepared by recrystallising four times from 33 per cent alcohol. The sample melted at 278.0 to 280.0 degrees centigrade and analysed as follows:

|  | C | H |
|---|---|---|
| Theory | 64.69 | 5.92 |
| Found | { 64.50 | 6.06 |
|  | { 64.65 | 5.92 |

The mixed melting point with an authentic dl-tryptophane was 278.0–280.0 degrees centigrade (uncorrected) (decomposed).

Example 6.—Preparation of tryptophane

The reduction can also be carried out chemically as follows: Ethyl alpha-nitro-beta-(3-indole)propionate (2.62 grams), 3.5 grams of powdered iron (or iron filings), 7.5 milliliters of water, 7.5 milliliters of alcohol, and 10 milliliters of concentrated hydrochloric acid were placed in a 250 milliliter flask, stirred vigorously for 15 minutes and then heated, with stirring, to boiling over a period of about 15 minutes. The reaction mixture was refluxed for 15 minutes, cooled to room temperature, made alkaline with 10 per cent aqueous sodium hydroxide, filtered, and washed with water. The clear alkaline solution was brought to a pH of 6.0 with concentrated sulfuric acid. After seeding and rubbing, crystallisation began. When crystallisation was complete, the product was filtered and recrystallised from 33 per cent alcohol, whereafter the dl-tryptophane melted at 283–4 degrees centigrade (uncorrected) (decomposed). A mixed melting point with an authentic dl-tryptophane was 283–283.5 degrees centigrade (decomposed).

It should be understood that the procedures outlined for the preparation of tryptophane which have been given are illustrative only of the types of alkylation, reduction, and hydrolysis reactions which may be employed in carrying out the method of our invention, and that we do not necessarily limit our invention to the specific details or procedures disclosed.

The alkylation step of our new process may be caused to occur with certain alkylating agents, previously identified, which have the formula

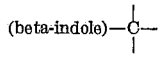

but which do not always introduce the (beta-indole)—$CH_2$— group into the nitroacetate molecule directly, but rather first introduce unsaturated or hydroxyl-containing groups which are convertible, after alkylation, to the (beta-indole)—$CH_2$— group, and it is to be understood that a such mode of operation under the invention is entirely within the purview of the present application. Representative intermediate compounds which may be produced by the condensation of beta-indolealdehyde and a selected nitroacetate, and which may be converted to alpha-nitro-beta-(3-indole)propionates, are as follows:

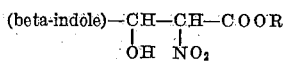

and

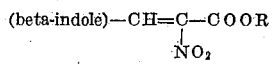

These hydroxyl-containing nitroacetates or unsaturated nitroacetates are usually quite stable under ordinary conditions, but are nevertheless convertible, as by gentle heating or mild reduction, to alpha-nitro- or alpha-amino-beta-(3-indole)propionates, whereby the group introduced by the alkylation is converted to the (beta-indole)—$CH_2$— group. One manner of describing the alkylation step of the process as herein broadly disclosed is therefore as follows: Alkylating an ester of nitroacetic acid with an agent capable of introducing into the acid portion of the nitroacetate molecule at the alpha carbon atom a (beta-indole)—$CH_2$— group or a group convertible thereto. This definition is broadly descriptive of the alkylation reaction, whether the (beta-indole)—$CH_2$— group be introduced directly, or whether some other closely related group be introduced and subsequently converted to (beta-indole)—$CH_2$—.

During the alkylation of an ester of nitroacetic acid with a 3-dialkylaminomethylindole or a quaternary salt thereof, e. g., gramine, a high temperature, e. g., materially above 100 degrees centigrade, or an excessively long reaction period, e. g., longer than about eight hours, or a proper combination of the two conditions, will effect production of an ester of alpha-nitro-bis-(3-methylindole)acetic acid. This is indicated by the following illustrative example, in which ethyl nitroacetate and gramine are the reactants.

*Alpha-nitro-bis(3-methylindole) acetic acid and esters thereof*

The following materials were placed in a 500 milliliter three-neck flask fitted with stirrer, nitrogen inlet tube and condenser.

| | |
|---|---|
| Gramine (3-dimethylaminomethylindole) grams | 17.32 |
| Ethyl nitroacetate do | 13.30 |
| Xylene (dry) milliliters | 85.00 |
| Sodium hydroxide (powdered) grams | 1.2 |

A slow stream of nitrogen was passed through the mixture which was heated with vigorous stirring to reflux, where dimethylamine was evolved. Refluxing was continued for eight hours, whereafter the solution was filtered hot and the solid washed with hot xylene and then with ether. The combined filtrate was extracted with 10 per cent hydrochloric acid and then washed with water to remove any unreacted gramine. The organic layer was concentrated to dryness in vacuo, leaving a crystalline residue weighing 18.2 grams. This corresponds to a crude yield of 91 per cent of ethyl alpha-nitro-bis(3-methylindole) acetate.

An analytical sample was prepared by recrystallising once from xylene and four times from ethanol. The melting point was found to be 142.0–143.0 degrees centigrade. Analysis:

| | C | H | N | M.W. |
|---|---|---|---|---|
| Theory | 67.6 | 5.41 | 10.73 | 391 |
| Found | 68.17 | 5.57 | 10.12 | 385 |
| | 67.98 | 5.34 | 10.32 | |

Hydrolysis of the ester is productive of alpha-nitro-bis(3-methylindole) acetic acid, while reduction thereof produces the corresponding amino compound, ethyl alpha-amino-bis(3-methylindole) acetate, melting with decomposition between about 94 and 100 degrees centigrade, which ester may be hydrolysed to yield the alpha-amino-bis(3-methylindole) acetic acid. The same procedure is of course equally operative with other esters of alpha-nitro-bis(3-methylindole) acetic acid, which may be produced in an analogous manner from any of the foregoing nitroacetates and a 3-dialkylaminomethylindole or a quaternary salt thereof.

The present application is a continuation-in-part of our application Serial 713,094, filed November 29, 1946.

Various modifications may be made in carrying out the method of the invention without departing from the spirit or scope thereof, and it is to be understood that we limit ourselves only as defined by the appended claims.

We claim:

1. The method which includes: alkylating an ester of nitroacetic acid with a 3-indolemethylating agent to produce an alpha-nitro-(3-indolemethyl)-acetate.

2. The method which includes: alkylating an ester of nitroacetic acid with a 3-dialkylaminomethylindole to produce an alpha-nitro-(3-indolemethyl) acetate.

3. The method which includes: alkylating an ester of nitroacetic acid with 3-dimethylaminomethylindole to produce an alpha-nitro-(3-indolemethyl) acetate.

4. The method of claim 3, wherein the temperature is maintained below about 100 degrees centrigrade.

5. The method which includes: reducing the nitro group of an ester of alpha-nitro-(3-indolemethyl) acetic acid to the amino group.

6. The method according to claim 5, wherein the reduction is by means of hydrogen and a hydrogenation catalyst selected from the group consisting of Raney nickel, $PtO_2$, platinum, and palladium.

7. The method which includes: (1) alkylating an ester of nitroacetic acid with 3-dimethylaminomethylindole, (2) reducing the alpha-nitro-(3-indolemethyl)-acetate thus formed, and (3) hydrolyzing the ester group of the alpha-amino-(3-indolemethyl)-acetate so produced to a carboxyl group.

8. The method which includes: (1) alkylating an ester of nitroacetic acid with a 3-dialkylaminomethylindole, and (2) reducing the nitro group of the alpha-nitro-(3-indolemethyl) acetate thus formed to an amino group.

9. The method which includes: (1) reducing an alpha-nitro-(3-indolemethyl) acetate to an alpha-amino-(3-indolemethyl) acetate, and (2) hydrolysing the ester group of the amino ester thus formed to a carboxyl group.

10. In a method for the preparation of tryptophane, the steps which include: (1) alkylating an ester of nitroacetic acid with a 3-dialkylaminomethylindole, (2) reducing the alpha-nitro-beta-(3-indole) propionate thus formed to an alpha-amino-beta-(3-indole) propionate, and (3) hydrolyzing the ester group of the alpha-amino-beta-(3-indole) propionate so produced to a carboxyl group.

11. An ester of alpha-nitro-beta-(3-indole)-propionic acid.

12. Ethyl alpha-nitro-beta-(3-indole) propionate.

13. Isopropyl alpha-nitro-beta-(3-indole) propionate.

14. The method which includes, (1) alkylating an ester of nitroacetic acid with an alkylating agent to introduce the (beta-indole)-$CH_2$- group and produce an alpha-nitro-(3-indolemethyl)-acetate, (2) reducing the substituted nitro-acetate to an amino ester, (3) hydrolysing the ester group of the amino ester with a base, and (4) acidifying the product.

15. An ester of alpha-nitro-bis(3-indolemethyl) acetic acid.

16. A compound selected from the group consisting of alpha-nitro-(3-indolemethyl)-acetic acids and esters thereof.

17. Ethyl alpha-nitro-bis-(3-indolemethyl)-acetate.

18. A lower-alkyl ester of alpha-nitro-beta-(3-indole) propionic acid.

19. A lower-alkyl ester of alpha-nitro-bis-(3-indolemethyl)-acetic acid.

20. Cyclohexyl alpha-nitro-beta-(3-indole)-propionate.

21. Benzyl alpha-nitro-beta-(3-indole) propionate.

22. The method which includes: reducing the nitro group of an ester of alpha-nitro-(3-indolemethyl)-acetic acid to the amino group with hydrogen and a hydrogenation catalyst selected from the group consisting of Raney nickel, platinum oxide, platinum, and palladium, at a temperature up to about 100 degrees centigrade.

23. The method which includes: (1) alkylating an ester of nitroacetic acid with a 3-dialkylaminomethylindole at a temperature up to about 100 degrees centigrade to produce an alpha-nitro-(3-indolemethyl)-acetate, and (2) reducing the nitro group of the alpha-nitro-(3-indolemethyl)-acetate thus formed to an amino group with hydrogen and a hydrogenation catalyst selected from the group consisting of Raney nickel, platinum oxide, platinum, and palladium, at a temperature up to about 100 degrees centigrade.

24. The method which includes: (1) reducing an alpha-nitro-(3-indolemethyl)-acetate to an alpha-amino-(3-indolemethyl)-acetate with hydrogen and a hydrogenation catalyst selected from the group consisting of Raney nickel, platinum oxide, platinum, and palladium at a temperature up to about 100 degrees centigrade, and (2) hydrolyzing the ester group of the amino ester thus formed with a base.

25. The method which includes: alkylating an ester of nitroacetic acid with a 3-dialkylaminomethylindole to produce an alpha-nitro-(3-indolemethyl)-acetate at a temperature below about 100 degrees centigrade, and separating the alpha-nitro-(3-indolemethyl)-acetate from the reaction product.

26. The method of claim 25, wherein the alkylating agent is 3-dimethylaminomethylindole.

27. The method of claim 25, wherein the ester of nitro-acetic acid alkylated is an alkyl nitroacetate.

28. The method which includes: (1) alkylating an ester of nitroacetic acid with a 3-dialkylaminomethylindole at a temperature up to about 100 degrees centigrade to produce an alpha-nitro-(3-indolemethyl)-acetate, (2) reducing the alpha-nitro-(3-indolemethyl)-acetate to an alpha-amino-(3-indolemethyl)-acetate with hydrogen and a hydrogenation catalyst selected from the group consisting of Raney nickel, platinum oxide, platinum, and palladium, and (3) hydrolyzing the ester group of the alpha-amino-(3-indolemethyl)-acetate so produced to a carboxyl group.

29. The method which includes: (1) alkylating an ester of nitroacetic acid with 3-dimethylaminomethylindole at a temperature up to about 100 degrees centigrade to produce an alpha-nitro-(3-indolemethyl)-acetate, (2) reducing the alpha-nitro-(3-indolemethyl)-acetate to an alpha-amino-(3-indolemethyl)-acetate with hydrogen and a hydrogenation catalyst selected from the group consisting of Raney nickel, platinum oxide, platinum, and palladium, at a temperature up to about 100 degrees centigrade, (3) hydrolyzing the ester group of the amino ester with a base, and (4) acidifying the product to obtain the free amino acid.

DAVID I. WEISBLAT.
DOUGLAS A. LYTTLE.

REFERENCES CITED

The following references are of record in the file of this patent:

UNITED STATES PATENTS

| Number | Name | Date |
| --- | --- | --- |
| 2,071,327 | Bley | Feb. 23, 1937 |
| 2,301,829 | Studer | Nov. 10, 1942 |
| 2,368,073 | Tryon | Jan. 23, 1945 |
| 2,407,560 | Kuhn et al. | Sept. 10, 1946 |

OTHER REFERENCES

Bouveault et al.: Bull. Soc. Chim. de Paris, 3rd series, vol. 25 (1901), pp. 911–914.

Jackson et al.: J. Am. Chem. Soc., vol. 52 (1930), pp. 5029–5035.

Beilstein, Vierte Auflage—2nd supplement to vol. 2 (1934), page 234, citing: Steinkopf—Annalen—vol. 434, page 29.

Karrer: "Organic Chemistry," Elsevier Co., New York, 1938 (1st edition), pages 92 and 93.

Albertson et al.: J. Am. Chem. Soc., vol. 67 (1945), pp. 36 and 37.